US009914531B2

(12) United States Patent
Frank

(10) Patent No.: US 9,914,531 B2
(45) Date of Patent: Mar. 13, 2018

(54) METHOD FOR MANAGING THE BRAKING OF AN AIRCRAFT WITH SPEED MEASUREMENT CLOSE TO THE BRAKED WHEELS

(71) Applicant: MESSIER-BUGATTI-DOWTY, Velizy-Villacoublay (FR)

(72) Inventor: David Frank, Velizy-Villacoublay (FR)

(73) Assignee: MESSIER-BUGATTI-DOWTY, Velizy Villacoublay (FR)

( * ) Notice: Subject to any disclaimer, the term of this patent is extended or adjusted under 35 U.S.C. 154(b) by 88 days.

(21) Appl. No.: 14/914,705

(22) PCT Filed: Sep. 11, 2014

(86) PCT No.: PCT/EP2014/069461
§ 371 (c)(1),
(2) Date: Feb. 26, 2016

(87) PCT Pub. No.: WO2015/036520
PCT Pub. Date: Mar. 19, 2015

(65) Prior Publication Data
US 2016/0207612 A1 Jul. 21, 2016

(30) Foreign Application Priority Data
Sep. 13, 2013 (FR) ...................... 13 58852

(51) Int. Cl.
*G06F 7/00* (2006.01)
*B64C 25/42* (2006.01)
(Continued)

(52) U.S. Cl.
CPC .......... *B64C 25/426* (2013.01); *B60T 8/1703* (2013.01); *B60T 8/329* (2013.01);
(Continued)

(58) Field of Classification Search
CPC combination set(s) only.
See application file for complete search history.

(56) References Cited

U.S. PATENT DOCUMENTS 3,920,282 A 11/1975 Devlieg
2007/0265739 A1 11/2007 Griffith
(Continued)

FOREIGN PATENT DOCUMENTS

EP 2 567 873 A2 3/2013

OTHER PUBLICATIONS

International Search Report for PCT/EP2014/069461 dated Jul. 22, 2015.

*Primary Examiner* — Adam M Alharbi
(74) *Attorney, Agent, or Firm* — Sughrue Mion, PLLC

(57) ABSTRACT

The invention relates to a method for managing the braking of an aircraft fitted with undercarriages (1) bearing braked wheels (2), the method comprising the step of generating braking commands by means of a braking computer (4) for each of the braked wheels as a function of longitudinal speed information representative of a longitudinal movement of the wheels in question, characterized in that there is placed at the bottom of the undercarriage, close to the braked wheels, a sensor adapted for generating a signal that can be used for generating the longitudinal speed information used for generating the braking commands.

8 Claims, 2 Drawing Sheets

(51) Int. Cl.
*B60T 8/17* (2006.01)
*B60T 8/32* (2006.01)
*B64C 25/34* (2006.01)

(52) U.S. Cl.
CPC ............... *B64C 25/34* (2013.01); *B60T 8/325* (2013.01); *B60T 2250/04* (2013.01)

(56) References Cited

U.S. PATENT DOCUMENTS

2008/0306687 A1* 12/2008 Ryu ..................... G01C 21/10
701/469
2013/0261920 A1* 10/2013 Picaut ................... B60T 8/1703
701/70

* cited by examiner

METHOD FOR MANAGING THE BRAKING OF AN AIRCRAFT WITH SPEED MEASUREMENT CLOSE TO THE BRAKED WHEELS The invention relates to a method for managing the braking of an aircraft comprising measurement of an inertial characteristic (acceleration, speed) directly close to the brakes.

BACKGROUND OF THE INVENTION

Aircraft fitted with undercarriages bearing braked wheels are known. The braking is managed by a braking computer which delivers braking commands to power distribution devices (servo-valves for the hydraulic brakes, controlled inverters or EMACs for the electromechanical brakes) which distribute braking power (regulated pressure or current) to the brakes. The braking commands are generally generated for each of the braked wheels taking account of a command slip rate to be applied to the wheel, which is calculated by comparing the longitudinal speed of the aircraft with the estimated peripheral speed of the wheel. If a difference appears, this is the sign that the wheel is starting to lock and it is appropriate to reduce the braking command until the wheel starts to rotate again sufficiently such that the peripheral speed is equal to the longitudinal speed reduced by the slip speed calculated using the command slip rate.

The longitudinal speed of the aircraft is generally provided by the inertial system of the aircraft.

PURPOSE OF THE INVENTION

The purpose of the invention is notably to improve the management of the braking of an aircraft, and to be able to propose new functionalities.

SUMMARY OF THE INVENTION

In order to achieve this objective, there is proposed a method for managing the braking of an aircraft fitted with undercarriages bearing braked wheels, the method comprising the step of generating braking commands by means of a braking computer for each of the braked wheels as a function of a difference between a peripheral speed of the wheel estimated using a tachometer generating a signal representative of the speed of rotation of the wheel, and a longitudinal speed representative of a longitudinal movement of the wheels in question. According to the invention, the longitudinal speed information used for the generation of the braking commands is generated with the help of a signal from a sensor separate from the tachometer disposed at the bottom of the undercarriage close to the braked wheels, making it possible to estimate the longitudinal speed at the level of the wheel which can transiently differ from the longitudinal speed of the aircraft.

Thus, rather than using longitudinal speed information generated by the inertial system of the aircraft, a signal is used which is measured as close as possible to the wheels by means of a dedicated sensor separate from the tachometer and which makes it possible to estimate the longitudinal speed at the level of the wheel accurately, which can differ transiently from the longitudinal speed of the aircraft because of the flexibility of the undercarriage and of the structure of the aircraft. Taking account of the refresh time of the braking commands (of the order of one tenth of a second), the method of the invention makes it possible to have the availability of relevant information of the instantaneous longitudinal speed of the wheel in question, thus preventing what is only an effect of the flexibility of the undercarriage and of the structure of the aircraft from being taken as a locking. The method of the invention thus makes it possible to improve the efficiency of the braking.

In practice, and according to a preferred implementation, the sensor comprises at least one accelerometer disposed close to the wheels, for example in an electronic housing fixed to the bottom of the undercarriage and adapted to measure the longitudinal acceleration undergone by the bottom of the undercarriage. The acceleration signal is then filtered and then processed in order to derive from it an item of longitudinal speed information which is representative of the true longitudinal speed of the braked wheels borne by that undercarriage.

The disposition of such a sensor close to the wheels allows new functionalities. For example, the signal from the sensor can be used for estimating the braking force developed by the brakes of the braked wheels borne by the undercarriage in question. Thereafter it is possible to set up a control of the rise in braking force in order to improve the comfort of the passengers, and to guarantee a maximum force level which makes it possible to size the structural parts subjected to the effects of the braking (undercarriages, undercarriage attachment members, structure of the aircraft etc.) more accurately.

Moreover, if the sensor comprises an accelerometer adapted to measure vertical accelerations, the corresponding signal can be used for estimating the vertical force undergone by the bottom part of the undercarriage, which is also called the suspended part as it is connected to the rest of the undercarriage by means of a shock absorber. Such estimation makes it possible to spot the cases of hard landing that can necessitate a maintenance operation on the undercarriage.

BRIEF DESCRIPTION OF THE DRAWINGS

The invention will be better understood in the light of the following description of particular non-limitative implementations of the invention, given with reference to the appended figures among which.

DETAILED DESCRIPTION OF THE INVENTION

Figure 1:
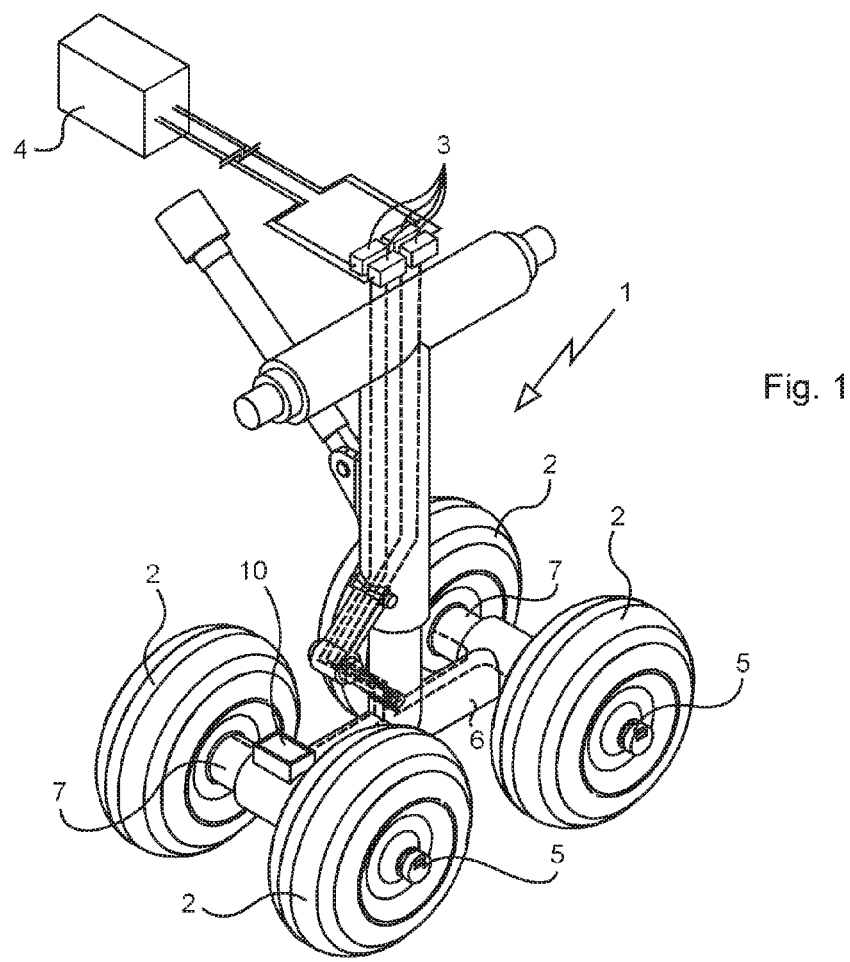
FIG. 1 is a diagrammatic view of an aircraft fitted with an undercarriage bearing braked wheels and provided with an electronic housing equipped with accelerometers.
Figures 2, 4:
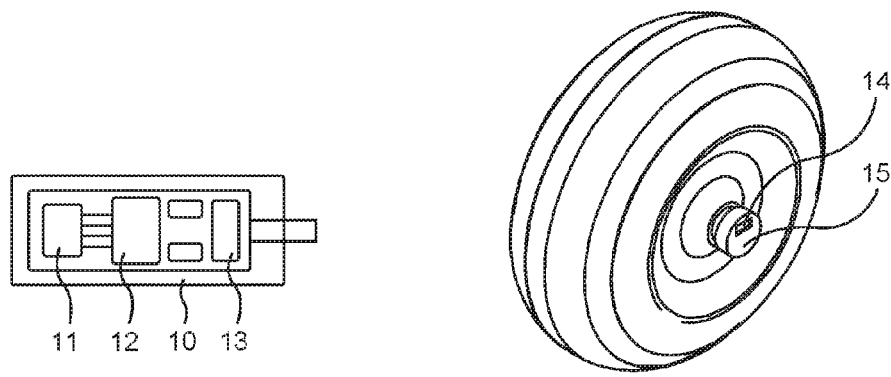
FIG. 2 is a diagrammatic view of the housing equipped with an accelerometer and mounted on the bus of the undercarriage.
FIG. 4 is a view of a wheel whose axle is equipped with a housing containing an accelerometer.

With reference to FIG. 1, the invention applies to an aircraft equipped with undercarriages 1 which bear wheels 2 fitted with brakes. The aircraft comprises power distribution devices 3 (for example servo valves in the case of hydraulic brakes) which are controlled electrically in order to supply the brakes with power (for example a fluid having regulated pressure) in response to a braking command generated by a braking computer 4 disposed in the avionics bay of the aircraft. In order to generate the braking command of a given wheel, the computer receives the signal from a tachometer 5 representative of the speed of rotation of the wheel. Using this, the computer estimates the peripheral speed of the wheel by the formula v=R×w, where w is the speed of rotation estimated from the signal from the tachometer 5, and R is the rolling radius of the wheel.

This speed must be compared with a longitudinal speed representative of a speed of longitudinal displacement of the wheel. In order to do this, and according to the invention, the undercarriage is equipped with an electronic housing 10 containing an accelerometer 11 adapted for measuring a longitudinal acceleration of the bottom of the undercarriage. In this case, the housing 10 is fixed on the beam 6 which bears the axles 7 receiving the wheels of the undercarriage. The housing can also be fixed on the sliding rod of the undercarriage at the end of which the beam is articulated. For undercarriages having only two wheels, the housing can be fixed on the sliding rod. It is essential that the housing should be placed close to the wheels, on a non-suspended part of the undercarriage.

Figure 3:
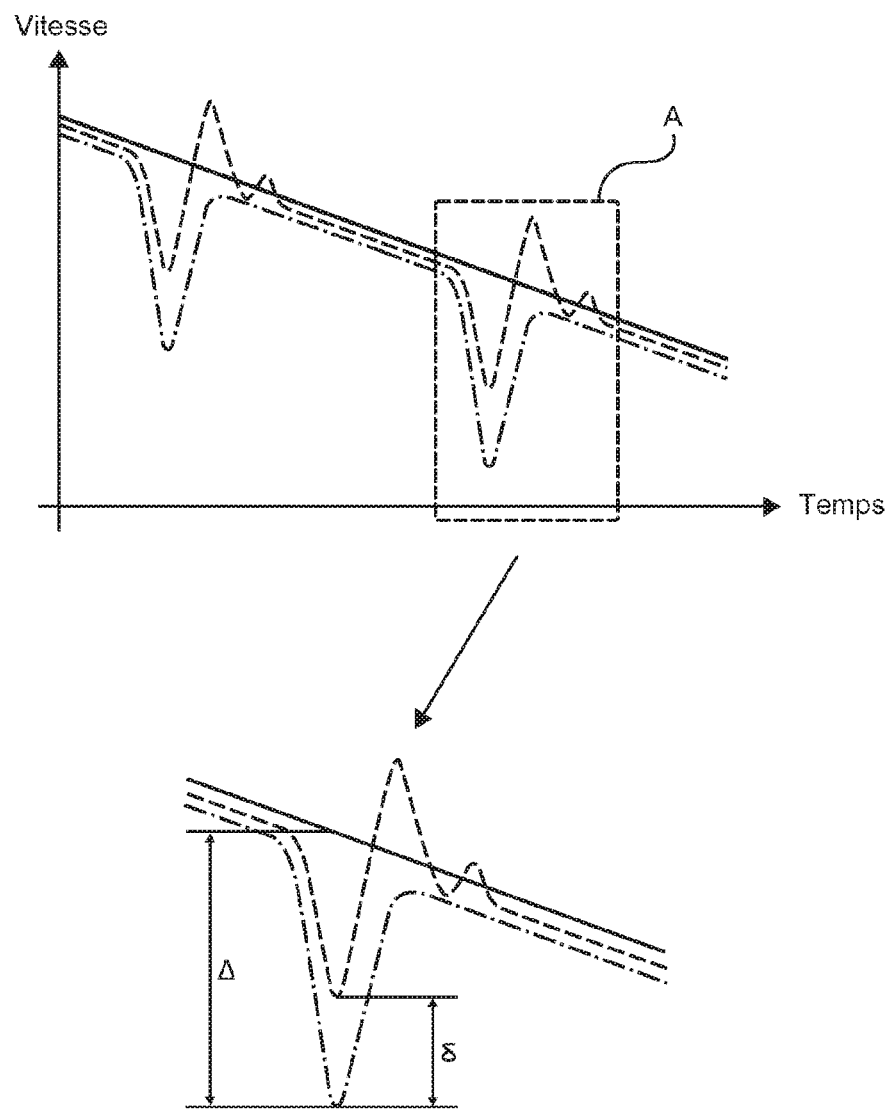
FIG. 3 is a diagram showing the speed estimated by means of the signal from the accelerometer, and the speed of the centre of gravity of the aircraft as provided by the inertial system of the aircraft.

The signal from the accelerometer 11 is processed by a processing unit 12 (filtering, conditioning etc.) in order to generate longitudinal speed V of the bottom of the undercarriage information, which is illustrated in the diagram shown in FIG. 3. This figure shows the longitudinal speed of the bottom of the undercarriage information thus determined in dashed line, the speed of the aircraft as provided by the inertial system in solid line and the peripheral speed of the wheel in dotted and dashed line. In the figure there can be observed the differences of longitudinal speed which can be attributed to the flexibility of the undercarriage and of the structure of the aircraft, and which show that what could be detected as a start of locking is not in fact one. For example, in the detail A, a significant difference Ä between the peripheral speed of the wheel and the longitudinal speed provided by the inertial system can be seen, whereas the difference δ between the peripheral speed of the wheel and the locally measured longitudinal speed is not significant. Whereas the difference Δ would have given rise to the detection of a start of locking, the taking into account of the real difference δ makes it possible to avoid such false detections which result in releasing the braking force. This arrangement of the invention makes it possible to improve the control of the braking.

According to another aspect of the invention, the signal from the accelerometer 11 is used by the braking computer 4 for estimating a longitudinal force undergone by the bottom of the undercarriage. This force is representative, apart from the inertia of the masses borne by the bottom of the undercarriage, of the braking forces generated by the brakes of the wheels borne by the undercarriage. The estimation of the braking force by the means of the invention makes it possible to use strategies for limiting the rate of increase of braking force that are more efficient than the strategies currently used, such as limiting the increase of pressure which is generally carried out in a very conservative manner taking account of dispersion of the gains of the brakes. These strategies are used for avoiding any overload of the structure of the aircraft during the increase in braking force. It particularly relates to those aircraft having a long and relatively flexible fuselage, such as for example the Airbus A340-600. The direct estimation of the braking force developed by the wheels borne by an undercarriage makes it possible to implement a fine control, adapting to all possible dispersions of the gains of the brakes in question.

According to yet another aspect of the invention, the electronic housing 10 is equipped with a second accelerometer 13 adapted for measuring the vertical acceleration undergone by the bottom of the undercarriage. In the same way, the signal from the accelerometer 13 is filtered and processed in order to estimate a vertical force undergone by the bottom of the undercarriage, which is the suspended part of the latter. The vertical force information can be used for triggering warnings in the case of a hard landing or in the case of running off the runway generating large jolts capable of giving rise to a maintenance operation on the undercarriage and the associated wheels.

The invention lends itself to numerous variants. Provision can be made for measuring other accelerations, like a lateral acceleration making it possible to estimate the lateral forces undergone by the undercarriage during a turn, or for measuring angular accelerations of the bottom part of the undercarriage (by means of gyrometers for example, or of an accelerometer disposed at the end of a beam of a bogie undercarriages) making it possible to estimate instantaneous speed of rotation rates undergone by the bottom part of the undercarriage, or a torsion undergone by this same bottom part. The signals could also be dedicated by providing as many sensors as there are wheels. For example, as shown in FIG. 3, for each wheel an accelerometer 14 is placed directly in a housing 15 attached to the end of the axle bearing the said wheel and which also encloses the tachometer. The longitudinal acceleration undergone by the wheel is then measured as close to the wheel as possible so that the longitudinal speed estimated from the said acceleration is very close to the true longitudinal speed of the wheel.

According to a particular aspect of the invention, advantage is taken of the presence of the sensor at the bottom of the undercarriage in order to generate maintenance warnings or for monitoring the state of health of the undercarriage.

In particular, if the sensor comprises an accelerometer capable of detecting hard landings (for example when the vertical force estimated using the second accelerometer exceeds a specified threshold) the information from the accelerometer is used for generating a warning which will be sent to the pilot and/or stored in a log. More generally, any type of monitoring of the state of health of the undercarriage can be implemented with the signals coming from the sensor of the invention.

The invention claimed is:

1. A method for managing the braking of an aircraft fitted with undercarriages (1) bearing braked wheels (2), the method comprising:
   generating braking commands by means of a braking computer (4) for each of the braked wheels as a function of a difference between a peripheral speed of the wheel estimated using a tachometer generating a signal representative of the speed of rotation of the wheel, and a longitudinal speed representative of a longitudinal movement of the wheels in question,
   wherein the longitudinal speed information used for the generation of the braking commands is generated with the help of a signal from a sensor separate from the tachometer disposed at the bottom of the undercarriage close to the braked wheels, making it possible to estimate the longitudinal speed at the level of the wheel which can transiently differ from the longitudinal speed of the aircraft.

2. The method according to claim 1, characterized in that the sensor is mounted in a housing (10; 15) fixed on a sliding rod of the undercarriage, a beam of the undercarriage, or an axle of the undercarriage.

3. The method according to claim 2, characterized in that the housing comprises means of filtering and conditioning the signal from the sensor.

4. The method according to claim 1, characterized in that the sensor comprises a first accelerometer capable of measuring a longitudinal acceleration undergone by the bottom of the undercarriage.

5. The method according to claim 4, characterized in that the braking computer is adapted for using the signal from the first accelerometer in order to estimate a longitudinal force undergone by the bottom of the undercarriage.

6. The method according to claim 4, characterized in that the sensor comprises a second accelerometer capable of measuring a vertical acceleration undergone by the bottom of the undercarriage.

7. The method according to claim 1, characterized in that the braking computer is adapted for using the signal from the second accelerometer in order to estimate a vertical force undergone by the bottom of the undercarriage.

8. The method according to claim 7, characterized in that the signal from the second accelerometer is used for detecting and signalling hard landings.

\* \* \* \* \*